United States Patent Office 3,408,161
Patented Oct. 29, 1968

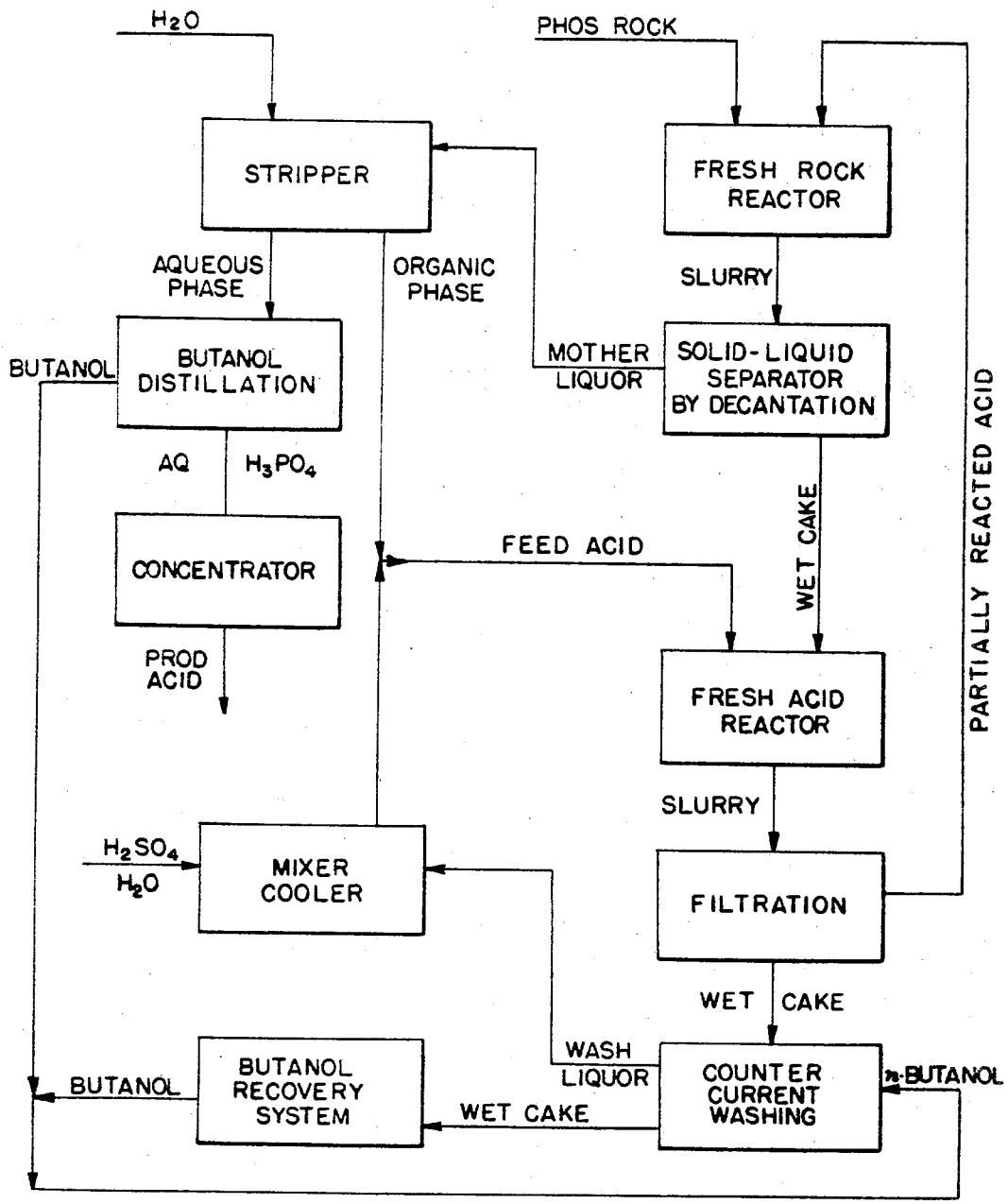

3,408,161
PRODUCTION OF PURIFIED WET PROCESS PHOSPHORIC ACID FROM PHOSPHATE ROCK
John D. Nickerson, Atlanta, and Clifford M. Payne, East Point, Ga., assignors, by mesne assignments, to Armour Agricultural Chemical Company, a corporation of Delaware
Filed Aug. 23, 1965, Ser. No. 481,726
9 Claims. (Cl. 23—165)

ABSTRACT OF THE DISCLOSURE

Phosphate rock is dissolved in a first reaction zone with sulfuric acid in an aqueous organic solvent medium, the solids separated from the liquid, water introduced into the liquid to form an aqueous phase and an organic phase with the phosphoric acid entering into the aqueous phase, the phosphoric acid being recovered from the aqueous phase, the solids passed to a second reaction zone where it meets the organic phase and additional sulfuric acid, thus forming a second reaction zone in which a slurry is formed, the slurry being filtered and the filtrate recycled to the first reaction zone.

---

This invention relates to the production of purified wet process phosphoric acid from phosphate rock by effecting reaction of the rock with sulfuric acid in an organic solvent under conditions which minimize the solubilization of impurities and reduce the number of processing steps normally found in solvent extraction procedures.

In prior practice, the production of purified wet process phosphoric acid has involved the solubilization of phosphate values by reaction of phosphate rock with mineral acids in aqueous media. In those instances where HCl and $HNO_3$ are used, soluble calcium salts are also present.

Purification procedures have almost entirely involved solvent extraction of $H_3PO_4$ from the aqueous digestion filtrate. Thus, extraction begins with the majority (+70%) of the phosphate rock impurities (Fe, Al, Mg, etc.) solubilized in the matrix. Where HCl and $HNO_3$ are used, handling of soluble calcium salts is necessary.

When phosphate rock reacts with sulfuric acid, gypsum precipitates and tends to coat unreacted rock particles, thus shielding the rock from further attack. This problem is more severe in the organic system than when digestion is carried out in an aqueous medium.

We have discovered that by employing a two-stage digestion system, phosphate rock can be effectively dissolved and purified $P_2O_5$ values obtained. In the process, we employ an organic solvent which is only partially miscible with water and phosphoric acid relatively free from impurities is then extracted into water from the single-phase organic mother liquor, taking advantage of the limited miscibility of the solvent in water and the distribution coefficient of $H_3PO_4$ between the organic and aqueous phases.

A primary object of the invention is to provide a process for the production of purified wet process phosphoric acid while minimizing the solubilization of impurities and reducing the number of processing steps normally found in solvent extraction procedures. A further object is to provide a process for the recovery of $P_2O_5$ values from phosphate rock through the use of sulfuric acid in a predominantly organic solvent. A still further object is to provide a two-stage digestion system in which substantially all of the phosphate rock is dissolved and a high recovery of the total $P_2O_5$ obtained. Other specific objects and advantages will appear as the specification proceeds.

In one embodiment of our invention, phosphate rock is dissolved with sulfuric acid in a predominantly organic solvent, the solids precipitated to form a cake, and the supernatant liquid containing phosphoric acid and the organic solvent withdrawn, preferably by decantation, and to the withdrawn liquid is introduced water is a stripping action to form an aqueous phase and a solvent phase with the phosphoric acid entering into the aqueous phase. The phosphoric acid may be recovered from the aqueous phase by distillation of residual organic solvent or any other suitable method. The solids or cake from the first reaction zone is then introduced into a second reaction zone into which the organic phase material from the stripper, together with additional sulfuric acid and organic solvent and water, is also introduced. The slurry produced in the second reaction zone is then preferably filtered and the filtrate containing solvent, sulfuric acid and phosphoric acid is returned to the first reaction zone for use in dissolving the rock therein.

We prefer to treat the wet cake from the filtration step with organic solvent and to return the wash liquor to the second reaction zone. After the washing step, the wet cake may be further treated to recover the solvent therefrom and the solvent may then be reutilized in the washing of the wet cake from the filtration step.

The foregoing embodiment of the invention is illustrated by the accompanying drawing, in which the figure sets out a flow sheet of the general process.

As illustrated in the drawing, phosphate rock is introduced into a fresh rock reactor where it meets recycled filtrate from a fresh acid reactor. The filtrate containing sulfuric acid, phosphoric acid, and organic solvent is introduced into the fresh rock reactor and heated to a temperature suitable for initiating reaction. We prefer to employ a temperature of about 40° C. or slightly below. From the fresh rock reactor, the slurry flows into a separator where the solids rapidly settle. The mother liquor is then withdrawn to a stripper into which water is introduced to bring about the separation of the aqueous phase and organic phase. In the specific process illustrated, the organic solvent is butanol and the aqueous phase containing the phosphoric acid is subjected to distillation for removing the butanol and the aqueous phase is then concentrated to obtain the desired purified phosphoric acid product.

As shown in the figure of the drawing, the organic phase is directed to the fresh acid reactor and into contact with the wet cake from the separator. A portion of the organic phase may be directed to the cake washing unit. The quantity will depend upon the particular organic solvent used and the washing requirements for the system being used. To the recycled organic phase material is preferably added sulfuric acid; and phosphoric acid and solvent, such as butanol, may also be added in make-up amounts. The slurry from the second reaction zone (fresh acid reactor) is then subjected to filtration and the filtrate returned, as heretofore described, to the first reaction zone (fresh rock reactor). The wet cake from the filter is then subjected to a countercurrent washing, employing butanol as the organic solvent, and the wash liquor is passed to a mixer cooler to which $H_2SO_4$ and water are added and the resulting mixture is passed also to the fresh acid reactor.

In the foregoing specific embodiment, the organic solvent may be any organic solvent which is only partially miscible with water and which is effective for the rejection of the bulk of the gypsum, metal (iron, aluminum, magnesium, etc.) and fluorine impurities, while at the same time responding to the introduction of water for forming the aqueous and solvent phases. Examples of such solvent are butanol and isoamyl alcohol.

The temperatures may vary depending upon the organic solvent employed. In the case of alcohols, we prefer to maintain a temperature near 40° C. but not substantially exceeding this temperature, in order to prevent the reaction of sulfuric acid with the organic solvent.

In the first reaction zone (fresh rock reactor), it is found that about 80% of the mother liquor is effectively removed without filtration and simply by a decantation or an overflow process. This is possible because the solids in the slurry are extremely well flocculated, and instantaneous settling occurs. We have found that this condition of flocculation takes place when the sulfuric acid concentration in the partially reacted acid stream or filtrate being returned to the fresh rock reactor is kept below 9%. The sulfuric acid concentration is in the range of 4–9%, and preferably is kept within the range of 5–8%.

The filtration of the slurry from the second reaction zone (fresh acid reactor) is preferably at a rate of about 40 gal./hr./ft.$^2$, which is comparable to conventional wet process $H_3PO_4$ filtration rates. Wash of the cake is effectively accomplished by a three-stage countercurrent wash requiring about one part by weight of solvent per part of dry cake.

Specific examples illustrative of the invention may be set out as follows:

Example I

The phosphate rock employed had the following analysis:

Total: Percent
$P_2O_5$ ---------------------------------- 32.6
CaO ---------------------------------- 48.4
F ---------------------------------- 4.1
Fe ---------------------------------- 0.44
Al ---------------------------------- 0.68
Mg ---------------------------------- 0.17
$CO_2$ ---------------------------------- 3.40

The process was carried out as shown in the drawing, employing butanol solvent. All of the data listed are in parts by weight. 26.63 parts of phosphate rock were introduced into the fresh rock reactor. The recycled filtrate (partially reacted acid) consisted of 114.57 parts, of which phosphoric acid comprised 17.51 parts, sulfuric acid 6.49 parts, butanol 68.17 parts, and water 22.40 parts. The total weight of the withdrawn mother liquor was 83.47 parts, 0 parts of sulfuric acid, 10.83 parts of phosphoric acid ($H_3PO_4$), 0.18 part of F, 0.02 part of iron, 0.007 part of aluminum, and 0.003 part of magnesium.

The wet cake fed to the fresh acid reactor had the following composition:

Total wt. ---------------------------------- 56.82
$CaSO_4 \cdot 2H_2O$ ---------------------------------- 11.39
$CaF_2$ ---------------------------------- 1.59
$CaHPO_4 \cdot 2H_2O$ ---------------------------------- 16.38
$Ca(H_2PO_4)_2 \cdot H_2O$ ---------------------------------- 12.00

In the second reaction zone (fresh acid reactor), the fresh acid feed had the following composition:

Total wt. ---------------------------------- 119.70
$H_2SO_4$ ---------------------------------- 22.20
$H_3PO_4$ ---------------------------------- 4.35
n-Butanol ---------------------------------- 65.01
$H_2O$ ---------------------------------- 28.14

From the fresh acid reactor, the recycled filtrate had the composition above described with a total weight of 114.57, while the wet cake leaving the filter had a total weight of 61.95 with a content of 5.50 $H_3PO_4$ and 1.71 $H_2SO_4$.

In the three-stage countercurrent washing system, the wash liquor returned to the fresh acid feed stage had a total weight of 40.71, a content of 4.35 $H_3PO_4$, 1.36 $H_2SO_4$, and 35.0 butanol and water. The wet cake passed to the butanol recovery system had a total weight of 61.24 and a content of 1.15 $H_3PO_4$, 0.35 $H_2SO_4$, dry cake 39.69, and 20.05 butanol and water.

An overall recovery of 96% of the total $P_2O_5$ was realized, with 99%+ dissolution of phosphate rock. The product phosphoric acid was 73 weight percent $P_2O_5$ when concentrated.

The purification obtained for iron, aluminum, magnesium, calcium, fluorine and $SO_4$ is set out in Table I below, while Table II indicates the percentages of the total impurities removed.

TABLE I.—IMPURITIES REJECTION
[$H_2SO_4$-n-Butanol Digestion of Phosphate Rock]

| | Weight Ratio of Impurities | | | | |
|---|---|---|---|---|---|
| | $P_2O_5/Fe$ | $P_2O_5/Al$ | $P_2O_5/Mg$ | $P_2O_5/CaO$ | $P_2O_5/F$ |
| Feed Rock | 74 | 48 | 192 | 0.9 | 8 |
| Product | 393 | 1,121 | 2,617 | >1,000 | 43 |

TABLE II.—PERCENT OF TOTAL FEED IMPURITY REMOVED

| Impurity: | Percent of total impurity Removed |
|---|---|
| Iron | 81.3 |
| Aluminum | 95.7 |
| Magnesium | 92.8 |
| Fluorine | 81.3 |

In the foregoing process, a large proportion of the impurities are not attacked by either sulfuric or phosphoric acid. There is an extremely high-rejection of calcium and a calcium purification step is not necessary in our process. Because of the substantially instantaneous settling of the solids in the slurry in the first reaction zone, the bulk of the mother liquor can be removed simply by decantation. Multiple processing steps are avoided and a single countercurrent extraction is sufficient.

Example II

The process was carried out as described in Example I except that isoamyl alcohol was employed, with comparable results. The partially reacted acid contained about 6 parts by weight $H_2SO_4$ and the phosphoric acid was about 15 parts by weight.

While, in the foregoing specification, we have set out procedure steps in considerable detail for the purpose of illustrating embodiments of the invention, it will be understood that such details may be varied widely by those skilled in the art without departing from the spirit of our invention.

We claim:

1. In a process for the recovery of phosphoric acid from phosphate rock, the steps of dissolving phosphate rock in a first reaction zone with sulfuric acid in an aqueous organic solvent medium, separating the liquid from the solids, introducing water into the liquid to form an aqueous phase and an organic phase with the phosphoric acid entering into the aqueous phase, recovering phosphoric acid from the aqueous phase, passing said solids to a second reaction zone, introducing said organic phase and additional sulfuric acid into said reaction zone to form a slurry, filtering the slurry, and recycling the filtrate to said first reaction zone.

2. In a process for the recovery of phosphoric acid from phosphate rock, the steps of dissolving phosphate rock in a first reaction zone with sulfuric acid in an organic solvent to form a slurry, precipitating the solids, withdrawing the supernatant liquid containing phosphoric acid and organic solvent, introducing water into the withdrawn liquid to form an aqueous phase and an organic phase with the sulfuric acid entering into the aqueous phase, recovering phosphoric acid from said aqueous phase, passing said solids to a second reaction zone, introducing said organic phase and additional sulfuric acid into said second reaction zone to form a slurry, filtering the slurry, and recycling the filtrate to said first reaction zone.

3. The process of claim 2 in which the $H_2SO_4$ concentration in the recycled filtrate is maintained below 9% by weight.

4. In a process for the recovery of phosphoric acid from phosphate rock, the steps of dissolving phosphate rock in a first reaction zone with sulfuric acid in an organic solvent to form a slurry, separating the liquid from the solids, withdrawing the liquid and introducing therein water to form an aqueous phase and an organic phase with the phosphoric acid entering the aqueous phase, separating the organic phase and passing same to a second reaction zone and adding thereto additional sulfuric acid, passing said solids to said second reaction zone for forming a slurry, filtering the slurry, recycling the filtrate from said slurry to said first reaction zone, washing the solids from said filtration step with organic solvent, and returning the wash liquor therefrom to said second reaction zone.

5. In a process for the recovery of phosphoric acid from phosphate rock, the steps of dissolving rock with sulfuric acid in a predominantly organic solvent only partially miscible with water, maintaining the $H_2SO_4$ concentration in said zone in the range of 4–9 weight percent, withdrawing slurry from said first reaction zone, precipitating the solids, decanting the supernatant liquid containing phosphoric acid and organic solvent, introducing water into the withdrawn liquid to form an aqueous phase into which the phosphoric acid enters and an organic phase, separating said organic phase and passing the same to a second reaction zone together with additional sulfuric acid, introducing said rock solids from said first reaction zone into said second reaction zone to form a slurry, filtering the slurry, and recycling the filtrate to said first reaction zone.

6. In a process for the recovery of purified $P_2O_5$ values from phosphate rock, the steps of successively digesting the rock in two reaction zones through the use of sulfuric acid in an organic solvent, the slurry formed in the second reaction zone being filtered and the filtrate containing $H_2SO_4$, phosphoric acid, and solvent returned to said first reaction zone for reaction with fresh phosphate rock, subjecting the slurry from the first reaction zone to a separating step in which the solids are passed to the second reaction zone and the liquid from said first reaction zone is stripped with water to form an aqueous phase into which the phosphoric acid enters and an organic phase, distilling residual organic solvent in the aqueous phase to recover phosphoric acid, and passing said organic phase, together with additional sulfuric acid, to said second reaction zone.

7. The process of claim 6 in which the concentration of the sulfuric acid in the filtrate from said second reaction zone is maintained below 9 weight percent.

8. In a process for the recovery of purified $P_2O_5$ values from phosphate rock, the steps of dissolving the rock in a first reaction zone with sulfuric acid in an organic solvent which is partially miscible with water to dissolve the rock and to form a slurry, subjecting the slurry to a settling operation for precipitating the solids, decanting the liquid and introducing water thereinto to strip the same and form aqueous and organic phases, separating the aqueous phase containing sulfuric acid, passing the organic phase to a second reaction zone, passing said solids from the first reaction zone into the second reaction zone, adding to said second reaction zone additional sulfuric acid, filtering slurry from said second reaction zone and returning the filtrate to said first reaction zone, withdrawing the solids from said filtration step, washing said solids with organic solvent, and returning the wash liquor therefrom to said second reaction zone.

9. The process of claim 8 in which said organic solvent is butanol.

References Cited
UNITED STATES PATENTS

| | | | |
|---|---|---|---|
| 2,049,032 | 7/1936 | Weber et al. | 23—165 |
| 2,885,266 | 5/1959 | Vickery | 23—165 |

OSCAR R. VERTIZ, *Primary Examiner.*

A. GREIF, *Assistant Examiner.*